(12) United States Patent
Wakabayashi et al.

(10) Patent No.: US 11,262,574 B2
(45) Date of Patent: Mar. 1, 2022

(54) LIGHT PATH SHIFTING DEVICE AND IMAGE DISPLAY DEVICE

(71) Applicant: SEIKO EPSON CORPORATION, Tokyo (JP)

(72) Inventors: Shinichi Wakabayashi, Suwa (JP); Masatoshi Ito, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 161 days.

(21) Appl. No.: 16/701,258

(22) Filed: Dec. 3, 2019

(65) Prior Publication Data

US 2020/0174246 A1 Jun. 4, 2020

(30) Foreign Application Priority Data

Dec. 4, 2018 (JP) .............................. JP2018-227056

(51) Int. Cl.
*G02B 26/08* (2006.01)
*G02B 6/35* (2006.01)

(52) U.S. Cl.
CPC ........... *G02B 26/08* (2013.01); *G02B 6/3568* (2013.01)

(58) Field of Classification Search
CPC .... G02B 26/08; G02B 6/3568; G02B 26/085; G02B 26/101; G02B 26/0875; G03B 21/142; G03B 21/006
USPC ..................................................... 359/223.1
See application file for complete search history.

(56) References Cited

U.S. PATENT DOCUMENTS

| 2009/0184775 A1 | 7/2009 | Komori et al. |
| 2015/0277104 A1 | 10/2015 | Hino |
| 2016/0227176 A1 | 8/2016 | Mizoguchi |
| 2019/0346684 A1* | 11/2019 | Chou .................. G02B 26/085 |

FOREIGN PATENT DOCUMENTS

| JP | 4503076 B2 | 7/2010 |
| JP | 2015-187678 A | 10/2015 |
| JP | 2016-142863 A | 8/2016 |
| WO | 2016/124253 A1 | 8/2016 |
| WO | 2018/019831 A1 | 2/2018 |

* cited by examiner

*Primary Examiner* — Euncha P Cherry
(74) *Attorney, Agent, or Firm* — Dority & Manning, P.A.

(57) ABSTRACT

A light path shifting device is provided with a glass plate which incident light enters, a first frame for holding the glass plate, a second frame for supporting the first frame in the state of being swingable around a first oscillation axis, a base member for supporting the second frame in the state of being swingable around a second oscillation axis crossing the first oscillation axis, a first actuator for oscillating the first frame, and a second actuator for oscillating the second frame, and is capable of shifting the light path of the incident light in a first direction and a second direction crossing the first direction by oscillating the first frame and the second frame to thereby change an incident angle of the incident light to the glass plate.

13 Claims, 7 Drawing Sheets

LIGHT PATH SHIFTING DEVICE AND IMAGE DISPLAY DEVICE

The present application is based on, and claims priority from JP Application Serial Number 2018-227056, filed Dec. 4, 2018, the disclosure of which is hereby incorporated by reference herein in its entirety.

BACKGROUND

1. Technical Field

The present disclosure relates to a light path shifting device and an image display device.

2. Related Art

In JP-A-2016-142863 (Document 1), there is disclosed an image display device equipped with a light path shifting device for shifting the light path of image light emitted from a light modulation device such as a liquid crystal panel. In the image display device of Document 1, the light path shifting device is used for making the resolution of the image to be projected higher than the resolution of the light modulation device. The light path shifting device (an optical device) of Document 1 has a movable section provided with a glass plate and a holding member for holding the glass plate, a support section for supporting the movable section, a pair of shaft sections for coupling the movable section and the support section to each other, and a drive mechanism for oscillating the movable section. It is possible for the light path shifting device to shift the light path by oscillating the holding member around an oscillation axis passing through the pair of shaft sections to change the posture of the glass plate to thereby refract the image light.

In the light path shifting device of Document 1, the glass plate is oscillated around the oscillation axis extending in a diagonal direction of the glass plate. Thus, it is possible to shift the light path of the image light in the diagonal direction of a pixel to be displayed on the screen to thereby shift the image display position in the diagonal direction of the pixel. Therefore, it is possible to make the shift amount of the image display position smaller than one pixel to thereby increase apparent pixels. Therefore, it is possible to make the image to be projected on a screen high in resolution.

In the light path shifting device of Document 1, since the oscillation direction of the glass plate is just one direction, the image light is shifted only in one direction. In order to increase the apparent pixels by the shift of the image light to achieve a further increase in resolution, it is desirable to make it possible to shift the image light in a plurality of directions.

SUMMARY

Alight path shifting device according to the present disclosure includes an optical member which incident light enters, a first frame configured to hold the optical member, a second frame configured to support the first frame in a state of being swingable around a first oscillation axis, a base member configured to support the second frame in a state of being swingable around a second oscillation axis crossing the first oscillation axis, a first actuator configured to oscillate the first frame around the first oscillation axis, and a second actuator configured to oscillate the second frame around the second oscillation axis, wherein a light path of the incident light is shifted in a first direction and a second direction crossing the first direction by oscillating the first frame and the second frame to thereby change an incident angle of the incident light to the optical member.

An image display device according to the present disclosure includes the light path shifting device described above disposed in a light path of image light, wherein the first actuator and the second actuator are driven to change the light path of the image light.

DESCRIPTION OF AN EXEMPLARY EMBODIMENT

An exemplary embodiment of the present disclosure will hereinafter be described with reference to the accompanying drawings. In the present specification, there are illustrated an X axis, a Y axis, and a Z axis as three axes perpendicular to each other, and one side in the X-axis direction is defined as a +X direction, and the other side thereof is defined as a −X direction for the sake of convenience of explanation. Further, one side in the Y-axis direction is defined as a +Y direction, the other side thereof is defined as a −Y direction, one side in the Z-axis direction is defined as a +Z direction, and the other side thereof is defined as a −Z direction.

Projector (Image Display Device)

Figure 1:
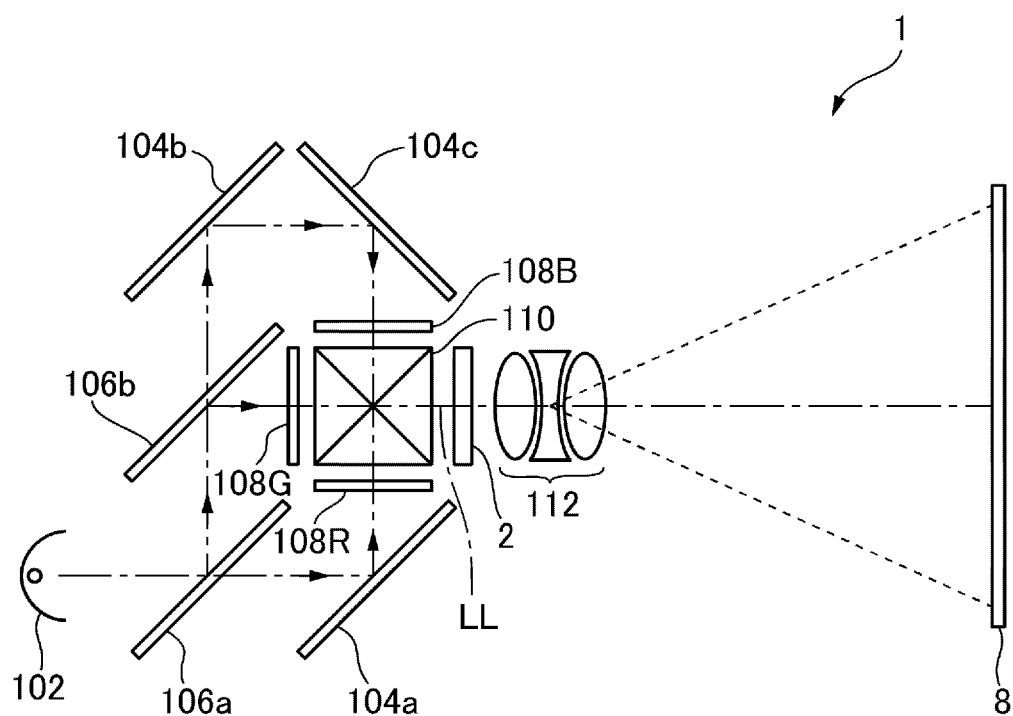
FIG. 1 is an explanatory diagram showing an optical configuration of a projector as an example of an image display device according to an embodiment of the present disclosure.

FIG. 1 is an explanatory diagram showing an optical configuration of a projector as an example of an image display device according to an embodiment of the present disclosure. The projector 1 shown in FIG. 1 is an LCD type projector. The projector 1 is a device showing an image on a screen 101 based on a video signal input from the outside. The projector 1 is provided with a light source 102, mirrors 104a, 104b, and 104c, dichroic mirrors 106a, 106b, liquid crystal display elements 108R, 108G, and 108B, a dichroic prism 110, a light path shifting device 2, and a projection optical system 112.

As the light source 102, there can be cited, for example, a halogen lamp, a mercury lamp, a light emitting diode (LED), and a laser source. Further, as the light source 102, there is used a device for emitting white light. The light emitted from the light source 102 is separated by, for example, the dichroic mirror 106a into red light (R) and the rest of the light. The red light is reflected by the mirror 104a, then enters the liquid crystal display element 108R, and the rest of the light is further separated by the dichroic mirror 106b into green light (G) and blue light (B). The green light enters the liquid crystal display element 108G, and the blue light is reflected by the mirrors 104b, 104c, and then enters the liquid crystal display element 108B.

The liquid crystal display elements 108R, 108G, and 108B are each used as a spatial light modulator (a light modulation device). These liquid crystal display elements 108R, 108G, and 108B are transmissive spatial light modulators (light modulation devices) corresponding respectively to the primary colors of R, G, and B, and are each provided with pixels arranged in, for example, a 1080×1920 matrix. In each of the pixels, the light intensity of the transmitted light with respect to the incident light is controlled, and in each of the liquid crystal display elements 108R, 108G, and 108B, the light intensity distribution of all of the pixels is controlled in a coordinated manner. The light beams spatially modulated by such liquid crystal display elements 108R, 108G, and 108B are combined with each other by the dichroic prism 110, and full-color image light LL is emitted from the dichroic prism 110. Then, the image light LL thus emitted is enlarged and projected on the screen 101 by the projection optical system 112.

The light path shifting device 2 is disposed between the dichroic prism 110 and the projection optical system 112. The projector 1 shifts the light path of the image light LL with the light path shifting device 2 (performs a so-called "pixel shift") to thereby display an image higher in resolution than the liquid display elements 108R, 108G, and 108B on the screen 101. For example, when the liquid crystal display elements 108R, 108G, and 108B are compliant with full high definition, a 4K image is displayed.

Figure 2:
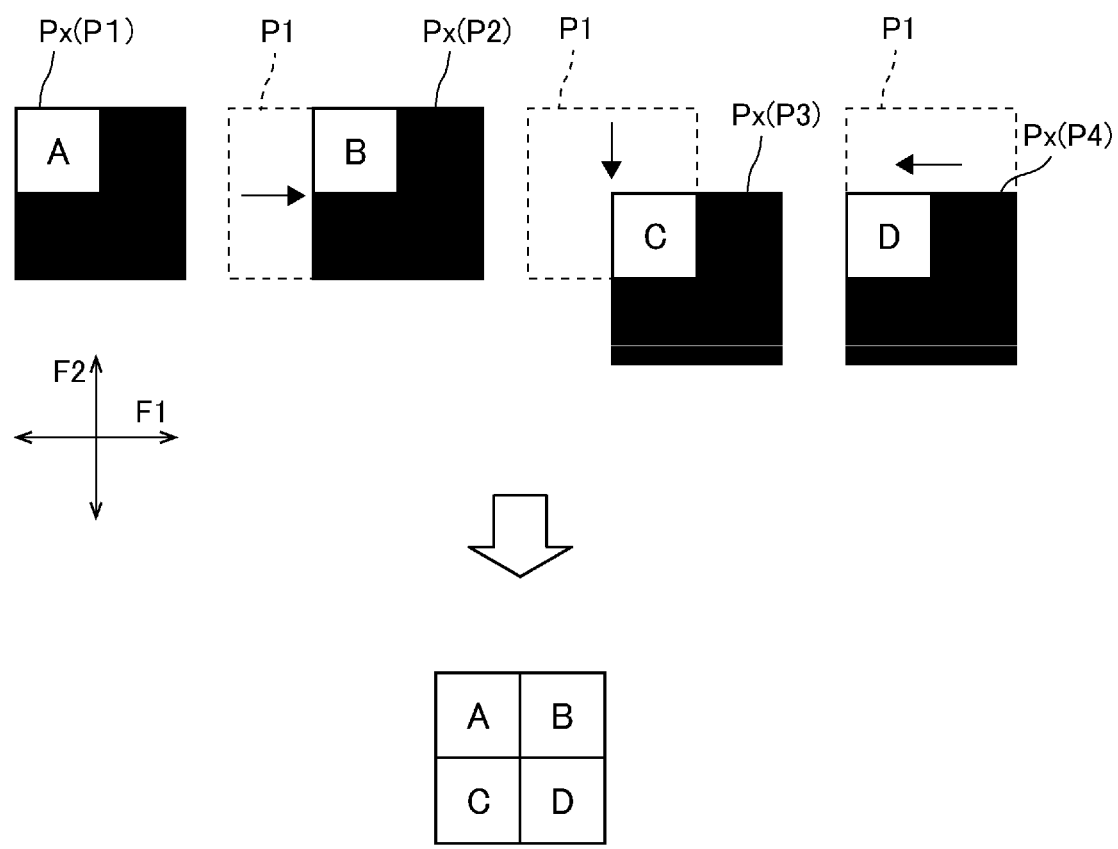
FIG. 2 is an explanatory diagram showing a shift of an image display position by a light path shift of image light.

Here, the principle of achieving high resolution by the light path shift will briefly be described using FIG. 2. FIG. 2 is an explanatory diagram showing a shift of an image display position by the light path shift of the image light. As described later, the light path shifting device 2 has a glass plate 30 as a light transmissive substrate for transmitting the image light LL, and by changing the posture of the glass plate 30, the light path of the image light LL is shifted using refraction.

In the present embodiment, by oscillating the glass plate 30 in two directions, namely a first oscillation direction around a first oscillation axis J1 described later, and a second oscillation direction around a second oscillation axis J2 crossing the first oscillation axis J1, the light path of the image light LL is shifted in two directions, namely a first direction F1 as a shift direction of the light path when oscillating in the first oscillation direction, and a second direction F2 as a shift direction of the light path when oscillating in the second oscillation direction. Thus, the pixel Px displayed on the screen 101 is displayed so as to be shifted in the first direction F1 and the second direction F2 crossing the first direction F1.

It is possible for the projector 1 to increase the apparent pixels to achieve high resolution of the image to be projected on the screen by combining the shift of the light path in the first direction F1 and the shift of the light path in the second direction F2 with each other. For example, as shown in FIG. 2, by shifting the light path of the image light LL, the pixel Px is moved to a position shifted as much as a half pixel (i.e., a half of the pixel Px) in each of the first direction F1 and the second direction F2. Thus, it is possible to shift the image display position on the screen 101 to an image display position P2 shifted from an image display position P1 in the first direction F1 as much as a half pixel, an image display position P3 shifted from an image display position P1 in each of the first direction F1 and the second direction F2 as much as a half pixel, an image display position P4 shifted from an image display position P1 in the second direction F2 as much as a half pixel.

As shown in FIG. 2, the light path shifting operation is performed so as to display an image at each of the image display positions P1, P2, P3, and P4 for a certain period to vary the display content in the liquid crystal display element in sync with the light path shifting operation. Thus, it is possible to apparently display pixels A, B, C, and D smaller in size than the pixel Px. For example, when performing display of the pixels A, B, C, and D with the wavelength of 60 Hz as a whole, it is necessary to make the liquid crystal display element perform the display at quad speed in accordance with the image display positions P1, P2, P3, and P4. In other words, the frequency of the display in the liquid crystal display element, namely a so-called refresh rate, becomes 240 Hz.

It should be noted that the first direction F1 and the second direction F2 are directions perpendicular to each other, and are the arrangement directions of the pixels Px displayed on the screen 101 in a matrix in the example of the pixel shift shown in FIG. 2, but are not required to be the directions perpendicular to each other, and can also be directions tilted with respect to the arrangement directions of the pixels Px. Even with such shifting directions, by arbitrarily combining the pixel shifts toward the first direction F1 and the second direction F2 with each other, it is possible to move the pixel Px to the image display positions P1, P2, P3, and P4 shown in FIG. 2. Further, the shift amount of the image display position is not limited to a half pixel, but can also be, for example, a fourth of the pixel Px, or three fourths thereof.

Figure 3:
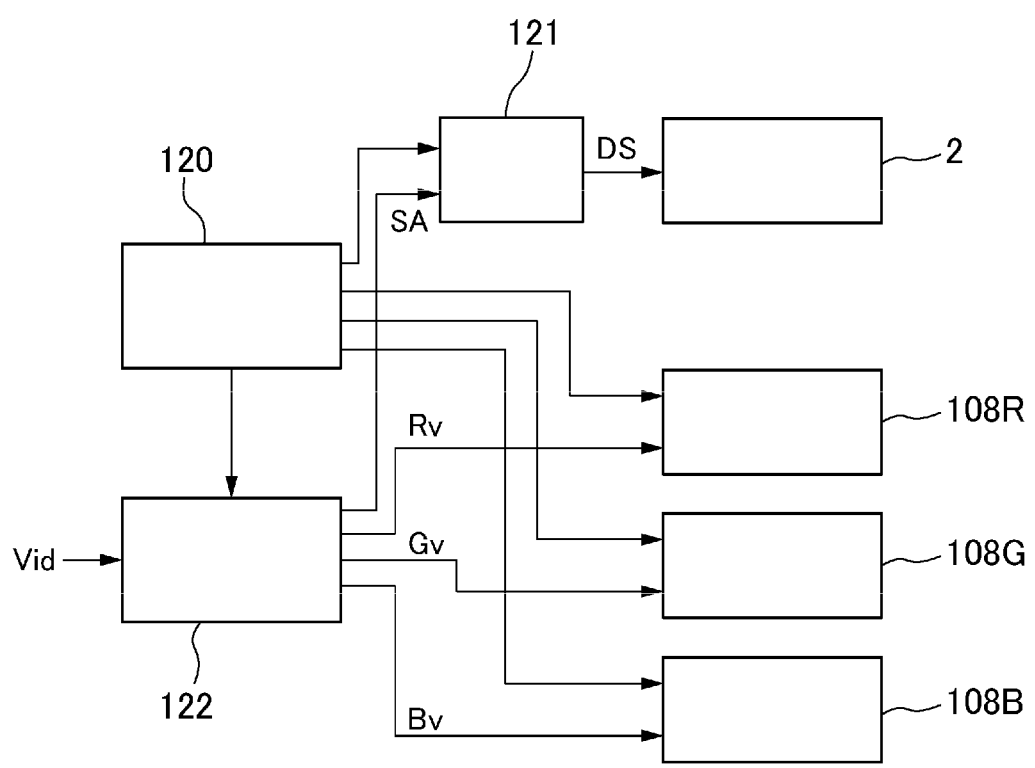
FIG. 3 is a block diagram showing an electrical configuration of the projector shown in FIG. 1.

FIG. 3 is a block diagram showing an electrical configuration of the projector 1 shown in FIG. 1. The projector 1 is provided with a control circuit 120, a drive signal processing circuit 121, and an image signal processing circuit 122. The control circuit 120 controls a writing operation of a data signal to the liquid crystal display elements 108R, 108G, and 108B, a light path shifting operation in the light path shifting device 2, a generation operation of a data signal in the image signal processing circuit 122, and so on. The drive signal processing circuit 121 supplies a drive signal DS for driving the light path shifting device 2 based on a sync signal SA output by the image signal processing circuit 122.

The image signal processing circuit 122 separates the image signal Vid supplied from an external device not shown by the three primary colors of R, G, and B, and at the same time converts the result into data signals Rv, Gv, and By suitable to the operations of the respective liquid crystal display elements 108R, 108G, and 108B. Then, the data signals Rv, Gv, and By thus obtained by the conversion are supplied respectively to the liquid crystal display elements 108R, 108G, and 108B, and the liquid crystal display elements 108R, 108G, and 108B operate based on the data signals Rv, Gv, and Bv, respectively.

Light Path Shifting Device

Figure 4:
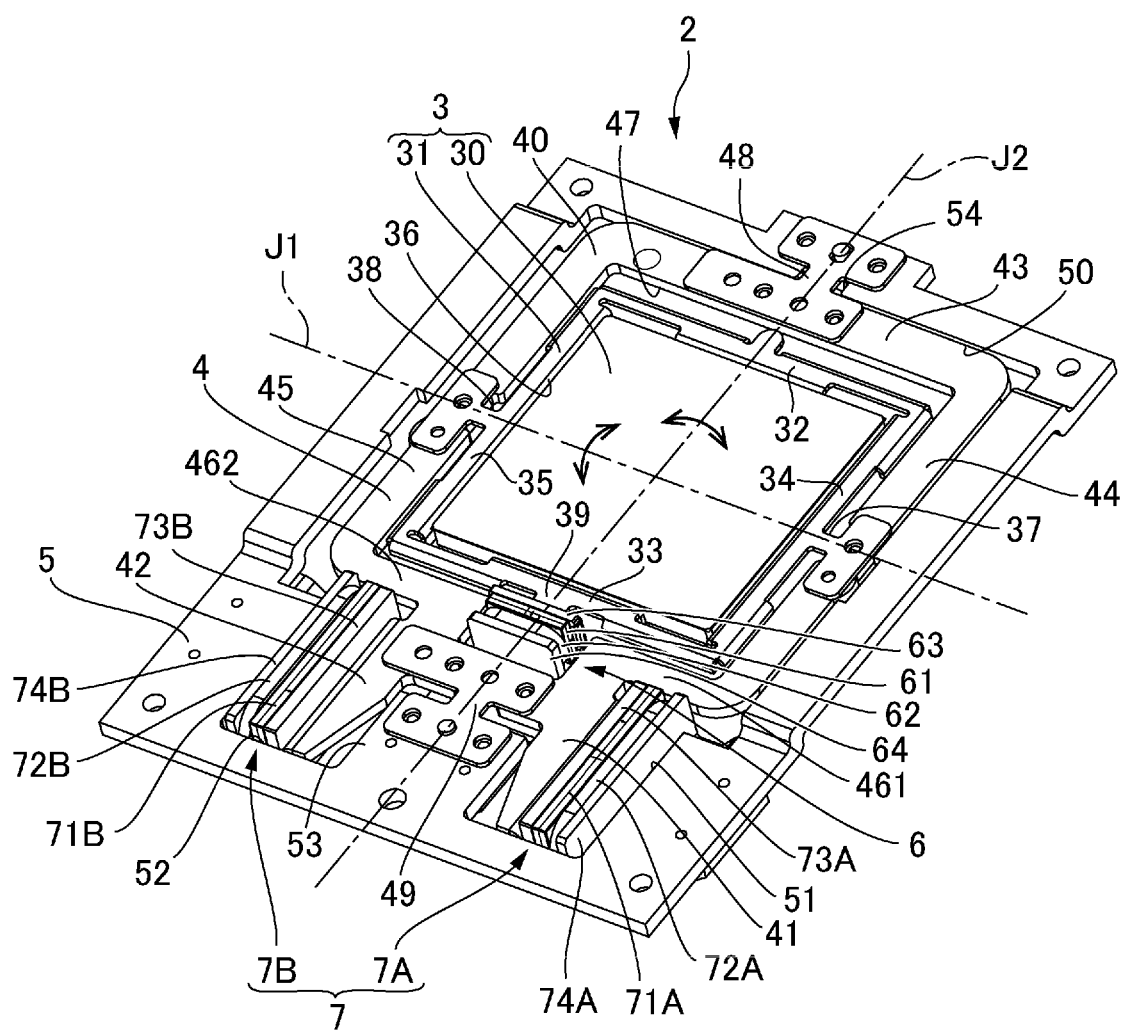
FIG. 4 is a perspective view of a light path shifting device according to the embodiment.
Figure 4:
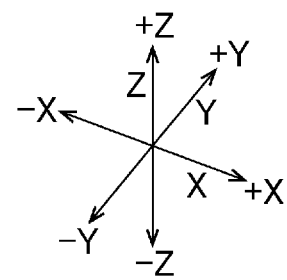
Figure 5:
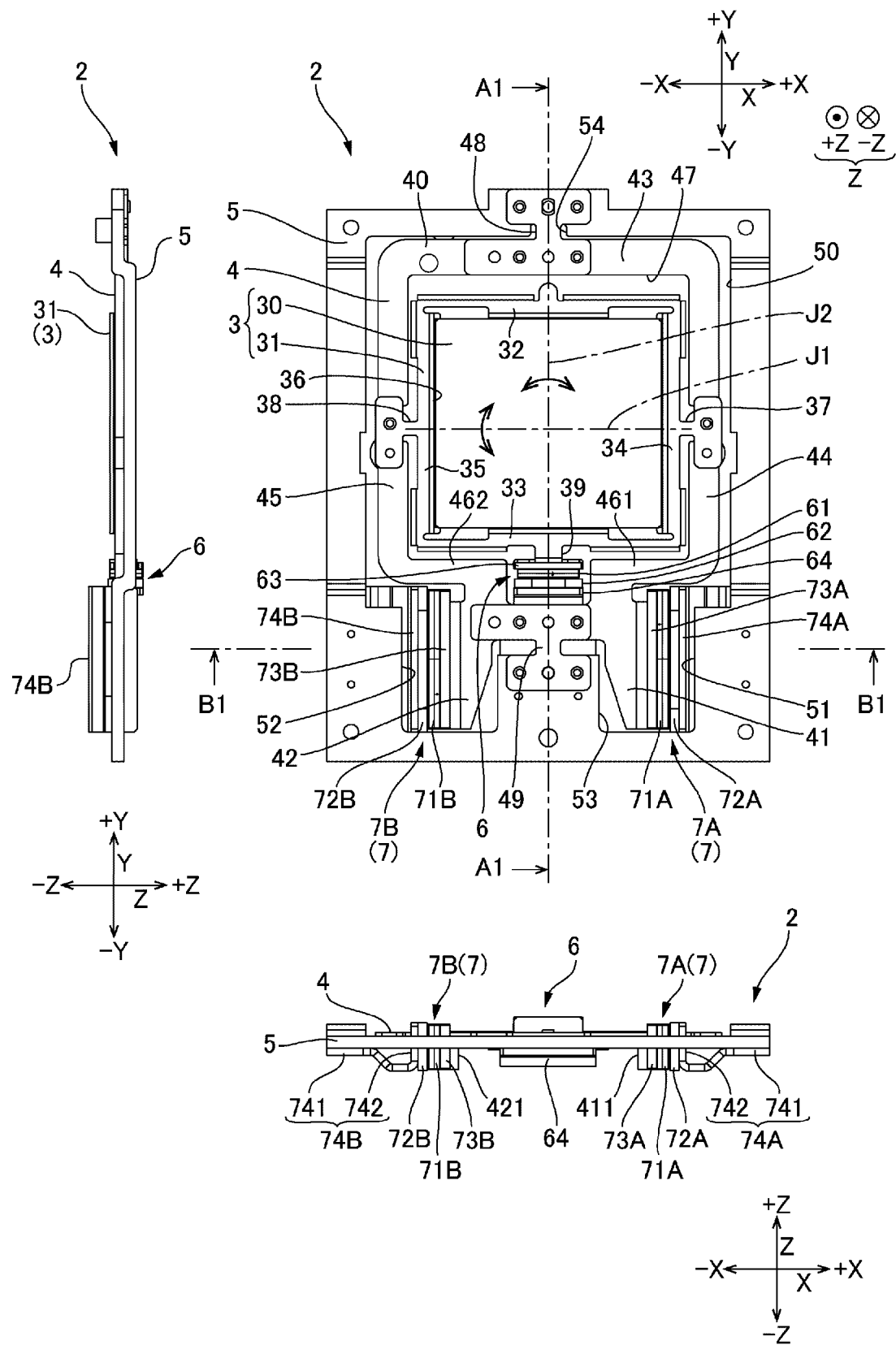
FIG. 5 includes a plan view and a side view of the light path shifting device shown in FIG. 4.

FIG. 4 is a perspective view of the light path shifting device 2 according to the present embodiment. The light path shifting device 2 is used for shifting the light path of the image light LL in the projector 1 shown in FIG. 1. FIG. 5 includes a plan view and a side view of the light path shifting device 2. The light path shifting device 2 is provided with a movable section 3 having a rectangular shape provided with the glass plate 30, and a first frame 31 for holding the glass plate 30. The light path shifting device 2 is further provided with a second frame 4 for swingably supporting the first frame 31, a base member 5 for swingably supporting the second frame 4, a first actuator 6, and a second actuator 7.

The glass plate 30 is a light transmissive substrate having a light transmissive property, and is an optical member which the image light LL enters. When the movable section 3 is located at a position (hereinafter referred to as a reference position) where the incident angle of the image light LL with respect to the glass plate 30 is 0°, the normal direction of the glass plate 30 coincides with the Z-axis direction. The light path shifting device 2 is disposed inside the projector 1 so that, for example, the +Z side faces to the dichroic prism 110 side and the −Z side faces to the projection optical system 112 side. It should be noted that the orientation of the Z-axis direction of the light path shifting device 2 can also be opposite thereto.

As shown in FIG. 4 and FIG. 5, the first frame 31 is disposed so as to surround the glass plate 30. The first frame 31 is a rectangular frame-like member provided with a first frame part 32 and a second frame part 33 extending substantially in parallel to the X axis, and a third frame part 34 and a fourth frame part 35 extending substantially in parallel to the Y axis. The first frame 31 is provided with a first opening part 36 which has a rectangular shape and is surrounded by the first frame part 32, the second frame part 33, the third frame part 34, and the fourth frame part 35. The glass plate 30 is disposed in the first opening part 36, and is fixed to the first frame part 32, the second frame part 33, the third frame part 34, and the fourth frame part 35. In the present embodiment, the first frame 31 is formed of a metal plate made of stainless steel or the like. Since the first frame 31 is a member having a bending structure in which a metal plate is bent, it is possible to ensure the necessary strength despite the structure using the metal plate thin in plate thickness.

The first frame 31 is provided with a first shaft part 37 and a second shaft part 38. The first shaft part 37 protrudes from the center in the Y-axis direction of the third frame part 34 toward the +X direction. Further, the second shaft part 38 protrudes from the center in the Y-axis direction of the fourth frame part 35 toward the −X direction. The first frame 31 is coupled to the second frame 4 with the first shaft part 37 and the second shaft part 38. In the present embodiment, a tip on the opposite side to the first frame 31 of each of the first shaft part 37 and the second shaft part 38 overlaps the second frame part 33 to be fixed to the second frame part 33. Thus, the first frame 31 is supported by the second frame 4 in the state of being swingable around the first oscillation axis J1 as a straight line connecting the first shaft part 37 and the second shaft part 38. The first actuator 6 oscillates the first frame 31 around the first oscillation axis J1.

The first oscillation axis J1 connecting the first shaft part 37 and the second shaft part 38 to each other is perpendicular to the Z-axis direction and the Y-axis direction, and extends in parallel to the X-axis direction. In the present embodiment, the first frame 31, the first shaft part 37, and the second shaft part 38 are formed integrally with each other. Therefore, the impact resistance and the long-term reliability in a boundary part between the first shaft part 37 and the second shaft part 38, and the first frame 31 are high.

The first frame 31 is provided with a protruding part 39 protruding from the center in the X-axis direction of the second frame part 33 toward the −Y direction. On the tip side of the protruding part 39, there is disposed the first actuator 6 for rotating the first frame 31 around the first oscillation axis J1. The protruding part 39 is a region the farthest from the first oscillation axis J1 in the first frame 31. Therefore, by applying drive force of the first actuator 6 to the first frame 31 via the protruding part 39, it is possible to oscillate the first frame 31 and the glass plate 30 with high torque. Thus, it is possible even for the first actuator 6 weak in drive force to rotate the first frame 31 and the glass plate 30 with high torque. Therefore, it is possible to achieve reduction in size and reduction in weight of the first actuator 6, and it is possible to achieve reduction in size and reduction in weight of the light path shifting device 2.

As shown in FIG. 4 and FIG. 5, the second frame 4 is disposed so as to surround the first frame 31. The second frame 4 is provided with a second frame main body part 40 surrounding the first frame 31, and a first protruding part 41 and a second protruding part 42 protruding from the second frame main body part 40. The second frame 4 is a single member provided with the second frame main body part 40, the first protruding part 41, and the second protruding part 42. In the second frame 4, the protruding direction of the first protruding part 41 and the protruding direction of the second protruding part 42 are the same in direction. In the present embodiment, the protruding direction of the first protruding part 41 and the protruding direction of the second protruding part 42 are the −Y direction.

The second frame main body part 40 is provided with a first frame part 43 extending substantially in parallel to the X axis, a second frame part 44 and a third frame part 45 extending substantially in parallel to the −Y direction from an end part in the +X direction and an end part in the −X direction of the first frame part 43, a fourth frame part 461 extending in the −X direction from an end part in the −Y direction of the second frame part 44, and a fifth frame part 462 extending in the +X direction from an end part in the −Y direction of the third frame part 45. The second frame main body part 40 is provided with a second opening part 47 having a rectangular shape surrounded by the first frame part 43 through the fifth frame part 462, and the first frame 31 is disposed in the second opening part 47. Among the first shaft part 37 and the second shaft part 38 for coupling the first frame 31 and the second frame 4 to each other, the first shaft part 37 is fixed to the second frame part 44. Further, the second shaft part 38 is fixed to the third frame part 45.

The fourth frame part 461 and the fifth frame part 462 do not extend to the center in the X-axis direction of the second frame 4, and are not connected to each other. In a gap with which the fourth frame part 461 and the fifth frame part 462 are opposed to each other, there are disposed the protruding part 39 protruding from the first frame 31 and the first actuator 6. The first protruding part 41 protrudes in the −Y direction from the fourth frame part 461, and is disposed on the +X direction side of the first actuator 6. Further, the second protruding part 42 protrudes in the −Y direction from the fifth frame part 462, and is disposed on the −X direction side of the first actuator 6. Therefore, the first actuator 6 is disposed in an area sandwiched between the first protruding part 41 and the second protruding part 42.

The second frame 4 is provided with a third shaft part 48 and a fourth shaft part 49 for coupling the second frame 4 and the base member 5 to each other. The third shaft part 48 and the fourth shaft part 49 are each formed of a member separated from the second frame main body part 40, the first protruding part 41, and the second protruding part 42. The third shaft part 48 is fixed to the first frame part 43 of the second frame main body part 40, and protrudes in the +Y direction from the center in the X-axis direction of the first frame part 43. Further, the fourth shaft part 49 is disposed between the first protruding part 41 and the second protruding part 42, and is fixed to the first protruding part 41 and the second protruding part 42. The fourth shaft part 49 is disposed on the −Y direction side of the first actuator 6 disposed between the first protruding part 41 and the second protruding part 42.

The second frame 4 is coupled to the base member 5 by the third shaft part 48 and the fourth shaft part 49. In other words, a tip in the +Y direction of the third shaft part 48 and a tip in the −Y direction of the fourth shaft part 49 overlap the base member 5, and are fixed to the base member 5. Thus, the second frame 4 is supported by the base member 5 in the state of being swingable around the second oscillation axis J2 as a straight line connecting the third shaft part 48 and the fourth shaft part 49. The second oscillation axis J2 connecting the third shaft part 48 and the fourth shaft part 49 to each other is perpendicular to the Z-axis direction and the X-axis direction, and extends in parallel to the Y-axis direction. The second actuator 7 oscillates the second frame 4 around the second oscillation axis J2.

In the second frame 4, the first protruding part 41 and the second protruding part 42 are arranged symmetrically about the second oscillation axis J2. The first protruding part 41 and the second protruding part 42 are each a region to which the drive force of the second actuator 7 is applied. The second actuator 7 is provided with a first vibrating section 7A provided to the first protruding part 41, and a second vibrating section 7B provided to the second protruding part 42. As described above, since the first actuator 6 is disposed between the first protruding part 41 and the second protruding part 42, the first actuator 6 and the second actuator 7 are both disposed on the −Y direction side of the first frame 31 and the glass plate 30.

As described later, the first vibrating section 7A is provided with a first magnet 71A and a first coil 72A disposed so as to be opposed to the first magnet 71A. Further, the second vibrating section 7B is provided with a second magnet 71B and a second coil 72B disposed so as to be opposed to the second magnet 71B. The detailed configuration of the second actuator 7 will be described later.

The base member 5 is a rectangular plate-like member having the Y-axis direction as the longitudinal direction, and is provided with a third opening part 50 having a rectangular shape in which the second frame main body 40 is disposed. On the inner circumferential edge in the −Y direction of the third opening part 50, a first recessed part 51 and a second recessed part 52 recessed in the −Y direction are disposed symmetrically about the second oscillation axis J2. In the first recessed part 51, there are disposed the first protruding part 41 of the second frame 4 and the first vibrating section 7A of the second actuator 7. Further, in the second recessed part 52, there are disposed the second protruding part 42 of the second frame 4 and the second vibrating section 7B of the second actuator 7. Between the first recessed part 51 and the second recessed part 52, there is disposed a protruding part 53 protruding in the +Y direction. Among the third shaft part 48 and the fourth shaft part 49 for coupling the second frame 4 and the base member 5 to each other, the fourth shaft part 49 is fixed to the protruding part 53. Further, the third shaft part 48 is disposed in a third recessed part 54 disposed on the inner circumferential edge in the +Y direction of the third opening part 50, and is coupled to an edge of the third recessed part 54.

The image light LL enters, for example, the glass plate 30 in the Z-axis direction. When the first frame 31 oscillates around the first oscillation axis J1, the incident angle of the image light LL with respect to the glass plate 30 changes, and the light path of the image light LL moves in the first direction F1 (see FIG. 2). Further, when the second frame 4 for holding the first frame 31 oscillates around the second oscillation axis J2, the incident angle of the image light LL with respect to the glass plate 30 changes in a different direction from when oscillating around the first oscillation axis J1, and the light path of the image light LL moves in the second direction F2 (see FIG. 2). In the example shown in FIGS. 4 and 5, the first direction F1 is the Y-axis direction, and the second direction F2 is the X-axis direction.

By the incident angle of the image light LL with respect to the glass plate 30 being tilted from 0°, the image light LL having entered the glass plate 30 is transmitted while being refracted. Therefore, by changing the posture of the glass plate 30 so as to achieve the target incident angle, it is possible to control the deflection direction and the deflection amount of the image light. It should be noted that the size of such a glass plate 30 is appropriately set so as to transmit the image light LL emitted from the dichroic prism 110. Further, it is preferable for the glass plate 30 to substantially be colorless and transparent. Further, an antireflection film can be formed on the surface of incidence and the exit surface of the image light LL of the glass plate 30.

The constituent material of the glass plate 30 is not particularly limited, but there can be used a variety of glass materials such as super white glass, borosilicate glass, or quartz glass. Further, although the glass plate 30 is used as the optical member in the present embodiment, it is sufficient for the optical member to be formed of a material having a light transmissive property, and refracting the image light LL. Specifically, besides the glass, it is also possible to adopt an optical member formed of, for example, a variety of crystalline materials such as crystal or sapphire, or a variety of resin materials such as polycarbonate resin or acrylic resin. It should be noted that when using the glass plate 30 as the optical member as in the present embodiment, the rigidity of the optical member can be made particularly high. Therefore, it is possible to control the variation in shift amount of the light path when shifting the light path of the image light LL in the optical member.

It should be noted that it is also possible to form the first frame 31, the second frame 4, and the base member 5 with resin or a material including resin.

First Actuator

Figure 6:
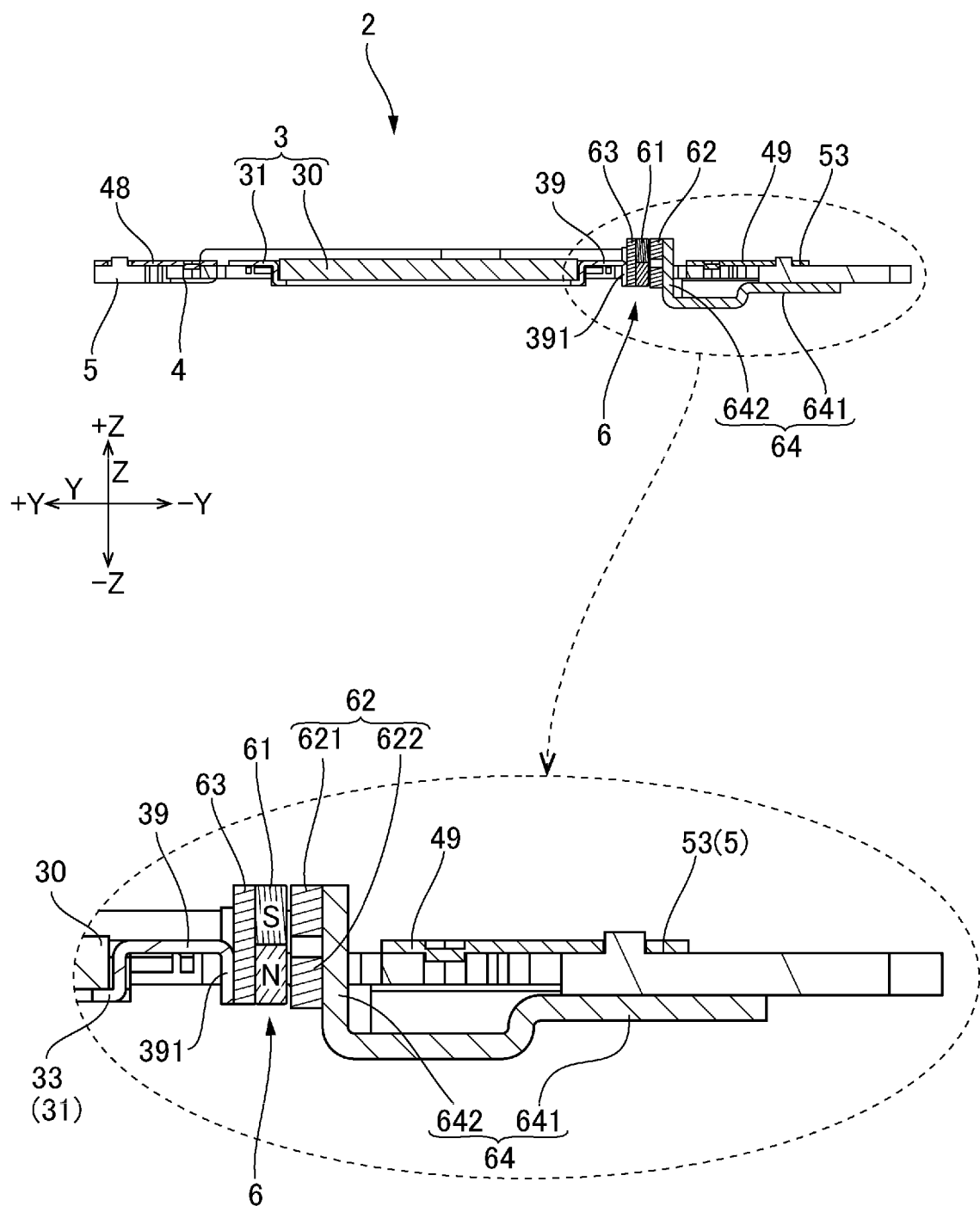
FIG. 6 includes a cross-sectional view of the light path shifting device shown in FIG. 4 cut at a position (the position A1-A1 in FIG. 5) of a first actuator, and a partial enlarged view thereof.

FIG. 6 includes a cross-sectional view of the light path shifting device 2 shown in FIG. 4 cut at a position (the position A1-A1 in FIG. 5) of the first actuator 6, and a partial enlarged view thereof. The first actuator 6 is a vibratory actuator provided with a third magnet 61 and a third coil 62 opposed to each other. The third magnet 61 and the third coil 62 are opposed to each other in a direction perpendicular to the Z-axis direction and at the same time perpendicular to the first oscillation axis J1. The Z-axis direction is the normal direction of the glass plate 30 when the glass plate 30 is located at the reference position. Therefore, the third magnet 61 and the third coil 62 are opposed to each other in the direction perpendicular to the normal direction of the glass plate 30 and the first oscillation axis J1.

In the first actuator 6, the third magnet 61 is held by the first frame 31, and the third coil 62 is held by the base member 5. In the present embodiment, the third magnet 61 is fixed to the protruding part 39 via a magnet holding plate 63. Further, the third coil 62 is fixed to the protruding part 53 of the base member 5 via a coil holding plate 64. As shown in FIG. 6, at the tip of the protruding part 39 of the first frame 31, there is disposed a bending part 391 bending in the −Z direction. The magnet holding plate 63 is fixed to the bending part 391. Further, the coil holding plate 64 is provided with an arm part 641 to be fixed to the protruding part 53 of the base member 5, and a coil fixation section 642 obtained by bending the tip in the +Y direction of the arm part 641 in the +Z direction. The coil fixation section 642 is opposed to the magnet holding plate 63 in the Y-axis direction. Therefore, the third magnet 61 to be fixed to the magnet holding plate 63 and the third coil 62 to be fixed to the coil fixation section 642 are opposed to each other in the Y-axis direction with a predetermined gap.

The third coil 62 is an air core coil having an oval shape, and is provided with two effective sides 621, 622 extending substantially in parallel to the first oscillation axis J1. The third coil 62 is positioned so that the two effective sides 621, 622 extending in the X-axis direction are arranged in the Z-axis direction, and is fixed to the coil fixation section 642.

In the third magnet 61, south poles and north poles are arranged in the Z-axis direction on an opposed surface opposed to the third coil 62. The third magnet 61 is a permanent magnet, and there can be used, for example, a neodymium magnet, a samarium-cobalt magnet, a ferrite magnet, and an alnico magnet. When the glass plate 30 and the first frame 31 are located at the reference position at which the normal direction of the glass plate 30 becomes parallel to the Z-axis direction (i.e., the incident angle of the image light LL to the glass plate 30 becomes 0°), in the first actuator 6, one of the S pole and the N pole of the third magnet 61 is opposed to the effective side 621, and the other is opposed to the effective side 622.

When energizing the third coil 62, the third magnet 61 relatively moves in the Z-axis direction (i.e., a direction crossing a surface of the glass plate 30) with respect to the third coil 62 held by the base member 5. Thus, the drive force around the first oscillation axis J1 is applied to the first frame 31 for holding the third magnet 61. In the first actuator 6, the magnet holding plate 63 and the coil holding plate 64 are made of metal such as iron, and function as a back yoke. Therefore, it is possible to reduce the leakage flux, and thus, it is possible to increase the magnetic efficiency.

Second Actuator

Figure 7:
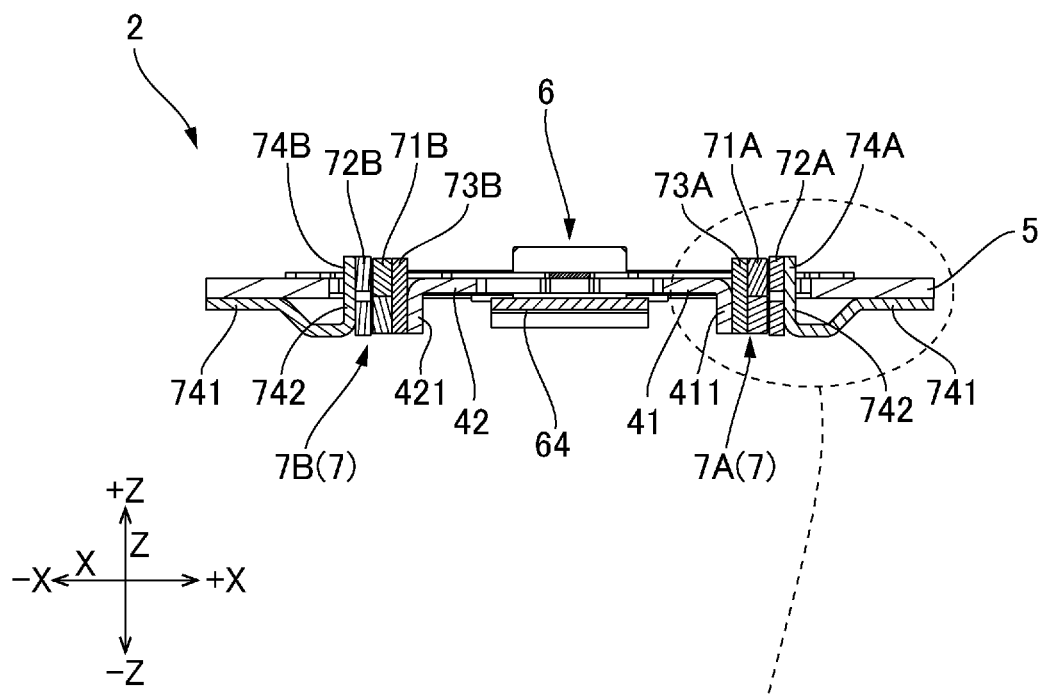
FIG. 7 includes a cross-sectional view of the light path shifting device shown in FIG. 4 cut at a position (the position B1-B1 in FIG. 5) of a second actuator, and a partial enlarged view thereof.
Figure 7:
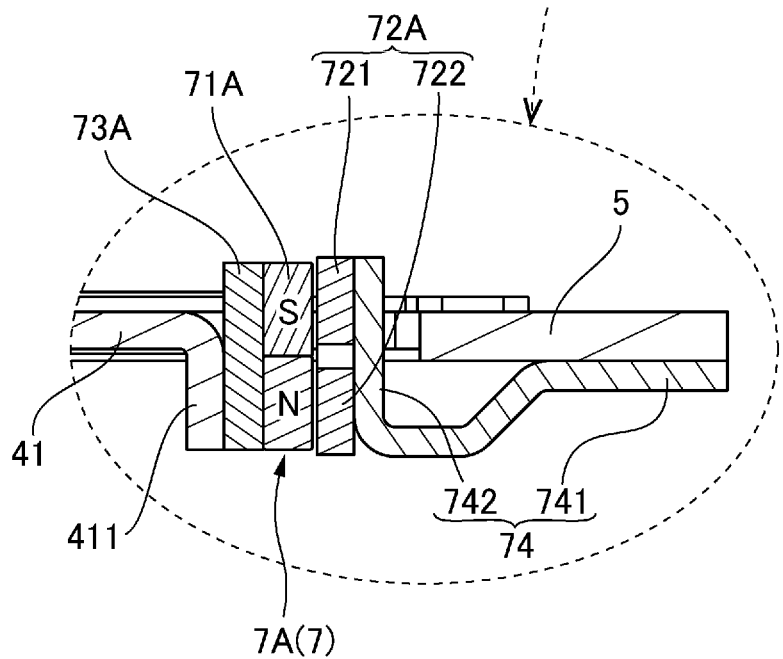

FIG. 7 includes a cross-sectional view of the light path shifting device shown in FIG. 4 cut at a position (the position B1-B1 in FIG. 5) of the second actuator 7, and a partial enlarged view thereof. As described above, the second actuator 7 is provided with a first vibrating section 7A for applying the drive force to the first protruding part 41, and the second vibrating section 7B for applying the drive force to the second protruding part 42. The first vibrating section 7A is the vibratory actuator provided with the first magnet 71A and the first coil 72A. Similarly, the second vibrating section 7B is the vibratory actuator provided with the second magnet 71B and the second coil 72B.

A set of the first magnet 71A and the first coil 72A, and a set of the second magnet 71B and the second coil 72B are each opposed to each other in a direction perpendicular to the Z-axis direction and the second oscillation axis J2. Therefore, the set of the first magnet 71A and the first coil 72A, and the set of the second magnet 71B and the second coil 72B are each opposed to each other in the direction perpendicular to the normal direction of the glass plate 30 and the second oscillation axis J2.

In the first vibrating section 7A, the first magnet 71A is held by the second frame 4, and the first coil 72A is held by the base member 5. The first magnet 71A is fixed to the first protruding part 41 via a magnet holding plate 73A. Further, the first coil 72A is fixed to the base member 5 via the coil holding plate 74A. The first protruding part 41 is provided with a bending part 411 having an end part in the +X direction bent in the −Z direction. The magnet holding plate 73A is fixed to the bending part 411. Further, the coil holding plate 74A is provided with an arm part 741 to be fixed to the base member 5, and a coil fixation section 742 obtained by bending the tip in the −X direction of the arm part 741 in the +Z direction. The coil fixation section 742 is opposed to the magnet holding plate 73A in the X-axis direction. Therefore, the first magnet 71A to be fixed to the magnet holding plate 73A and the first coil 72A to be fixed to the coil fixation section 742 are opposed to each other in the X-axis direction with a predetermined gap.

The first coil 72A is an air core coil having an oval shape, and is provided with two effective sides 721, 722 arranged substantially in parallel to each other. The first coil 72A is positioned so that the two effective sides 721, 722 extending in the X-axis direction are arranged in the Z-axis direction, and is fixed to the coil fixation section 742.

In the first magnet 71A, south poles and north poles are arranged in the Z-axis direction on an opposed surface opposed to the first coil 72A. As the first magnet 71A, there can be used, for example, a neodymium magnet, a samarium-cobalt magnet, a ferrite magnet, and an alnico magnet. When the first frame 31 and the glass plate 30 are located at the reference position at which the normal direction of the glass plate 30 becomes parallel to the Z-axis direction (i.e., the incident angle of the image light LL to the glass plate 30 becomes 0°), in the vibrating section 7A of the second actuator 7, one of the S pole and the N pole of the first magnet 71A is opposed to the effective side 721, and the other is opposed to the effective side 722.

When energizing the first coil 72A, the first magnet 71A relatively moves in the Z-axis direction (i.e., the direction crossing the surface of the glass plate 30) with respect to the first coil 72A fixed to the base member 5. Thus, the drive force around the second oscillation axis J2 is applied to the first frame 31 for holding the first magnet 71A. Also in the first vibrating section 7A, the magnet holding plate 73A and the coil holding plate 74A are made of metal such as iron, and function as a back yoke. Therefore, it is possible to reduce the leakage flux, and thus, it is possible to increase the magnetic efficiency.

The second vibrating section 7B is disposed symmetrically with the first vibrating section 7A about the second oscillation axis J2. In the second vibrating section 7B, the second magnet 71B is held by the second frame 4, and the second coil 72B is held by the base member 5. The second magnet 71B is fixed to the second protruding part 42 via a magnet holding plate 73B. Further, the second coil 72B is fixed to the base member 5 via the coil holding plate 74B. Similarly to the first protruding part 41, the second protruding part 42 is provided with a bending part 421 to which the magnet holding plate 73B is fixed. Since the second vibrating section 7B is the same in configuration as the first vibrating section 7A, the detailed description of the second vibrating section 7B will be omitted.

The first protruding part 41 and the second protruding part 42 are disposed in an inner area of the maximum width in the X-axis direction of the second frame 4. Further, the first vibrating section 7A and the second vibrating section 7B are similarly disposed in an inner area of the maximum width in the X-axis direction of the second frame 4. In other words, the first vibrating section 7A and the first protruding part 41 are disposed on the −X direction side of the second frame part 44 of the second frame main body part 40, and the second vibrating section 7B and the second protruding part 42 are disposed on the +X direction side of the third frame part 45 of the second frame main body part 40.

In the present embodiment, as described above, both of the first actuator 6 and the second actuator 7 fall within the range of the maximum width in the X-axis direction of the second frame main body part 40. As described above, since the first vibrating section 7A and the second vibrating section 7B are disposed inside in the width direction (the X-axis direction), it is possible to decrease the width dimension in the X-axis direction of the light path shifting device 2. Further, since the first magnet 71A and the second magnet 71B as members heavy in weight can be disposed so as to be shifted on the inner side in the width direction, it is possible to reduce the inertia when oscillating the second frame 4.

Drive Control of Light Path Shifting Device

The light path shifting device 2 oscillates the movable section 3 in the two directions, namely the first oscillation direction around the first oscillation axis J1 and the second oscillation direction around the second oscillation axis J2 using the drive signal DS to be supplied from the drive signal processing circuit 121 to the first actuator 6 and the second actuator 7. In each of the actuators, electrical currents flow through the first coil 72A, the second coil 72B, and the third coil 62, respectively, based on the drive signal DS. As a result, the movable section 3 performs a light path shifting operation having the oscillation in the first oscillation direction and the oscillation in the second oscillation direction combined with each other with a frequency corresponding to the drive signal DS. Thus, in the projector 1, the light path of the image light LL changes, and the image is displayed at the image display positions P1, P2, P3, and P4 with the frequency corresponding to the drive signal DS.

When driving the second actuator 7, the first coil 72A and the second coil 72B are energized in sync with each other. On that occasion, the directions of the currents flowing through the first coil 72A and the second coil 72B are controlled so that the moving direction of the first magnet 71A in the first vibrating section 7A and the moving direction of the second magnet 71B in the second vibrating section 7B become opposite to each other in the Z-axis direction. Thus, the force to be applied to the second frame 4 from the first vibrating section 7A, and the force to be applied to the second frame 4 from the second vibrating section 7B act as the force in the same rotational direction around the second oscillation axis J2.

Major Functions and Advantages of Present Embodiment

As described above, the light path shifting device 2 according to the present embodiment is provided with the glass plate 30 which the incident light enters, the first frame 31 for holding the glass plate 30, the second frame 4 for supporting the first frame 31 in the state of being swingable around the first oscillation axis J1, the base member 5 for supporting the second frame 4 in the state of being swingable around the second oscillation axis J2 crossing the first oscillation axis J1, the first actuator 6 for oscillating the first frame 31 around the first oscillation axis J1, and the second actuator 7 for oscillating the second frame 4 around the second oscillation axis J2. Further, by oscillating the first frame 31 and the second frame 4, the incident angle of the incident light to the glass plate 30 is changed to perform the light path shifting operation of shifting the light path of the incident light in the first direction F1, and the second direction F2 crossing the first direction F1.

As described above, in the present embodiment, it is possible not only to oscillate the first frame 31 for supporting the glass plate 30 around the first oscillation axis J1, but also to oscillate the first frame 31 and the glass plate 30 around the second oscillation axis J2 together with the second frame 4. Therefore, it is possible to realize the light path shifting device 2 capable of shifting the light path of the incident light to the glass plate 30 in two directions crossing each other.

Therefore, the light path shifting device 2 according to the present embodiment can be used for disposing the light path shifting device 2 in the light path of the image light LL in the image display device such as the projector 1, and driving the first actuator 6 and the second actuator 7 to change the light path of the image light LL. In this case, it is possible to shift the pixels Px to be displayed on the screen 101 on which the image light LL is projected toward the two directions crossing each other. Thus, since the degree of freedom of the pixel shift direction increases, it is possible to make the resolution of the image to be displayed on the screen higher compared to when shifting the pixels Px only in one direction. For example, it is possible to divide the pixel Px into an arbitrary number of pieces as in the present embodiment to perform the pixel shift to the image display position corresponding to each of the divisional positions. Therefore, the higher resolution can be achieved.

In the present embodiment, in the projector 1 (the image display device) provided with the light source 102, the liquid crystal display elements 108R, 108G, and 108B as the light modulation devices for modulating the light emitted from the light source 102, and the projection optical system 112 for projecting the light modulated by the liquid crystal display elements 108R, 108G, 108B in an enlarged manner, the light path shifting device 2 is disposed between the liquid crystal display elements 108R, 108G, and 108B and the projection optical system 112. By shifting the light path of the image light LL in an anterior stage of the projection optical system 112 in such a manner, it is possible to realize the light path shift using the light path shifting device 2 small in size. Therefore, the projector 1 (the image display device) can be reduced in size.

In the present embodiment, the first frame 31 is disposed so as to surround the glass plate 30 as the light transmissive substrate, and the second frame 4 is disposed so as to surround the first frame 31. Therefore, it is possible for the first frame 31 to hold the glass plate 30 in a stable state. Further, it is possible to easily dispose the support structure for supporting the first frame in a swingable manner, and the support structure for supporting the second frame 4 together with the first frame 31 in a swingable manner. For example, in the present embodiment, the first frame 31 has the first shaft part 37 and the second shaft part 38, the first frame 31 is coupled to the second frame 4 with the first shaft part 37 and the second shaft part 38, and the first oscillation axis J1 is the straight line connecting the first shaft part 37 and the second shaft part 38 to each other. Similarly, the second frame 4 has the third shaft part 48 and the fourth shaft part 49, the second frame 4 is coupled to the base member 5 with the third shaft part 48 and the fourth shaft part 49, and the second oscillation axis J2 is the straight line connecting the third shaft part 48 and the fourth shaft part 49 to each other. Due to such a configuration, it is possible to support the first frame 31 so as to be able to oscillate around the first oscillation axis J1. Further, it is possible to support the second frame 4 so as to be able to oscillate around the second oscillation axis J2 crossing the first oscillation axis J1.

In the present embodiment, the second frame 4 has the second frame main body part 40 surrounding the first frame 31, and the first protruding part 41 and the second protruding part 42 protruding from the second frame main body part 40, and the protruding direction of the first protruding part 41 and the protruding direction of the second protruding part 42 are the same direction (the −Y direction). Further, the second actuator 7 has the first vibrating section 7A and the second vibrating section 7B, wherein the first vibrating section 7A is provided to the first protruding part 41, and the second vibrating part 7B is provided to the second protruding part 42. Further, the first actuator 6 is disposed in the area sandwiched between the first protruding part 41 and the second protruding part 42.

As described above, by disposing the first actuator 6 and the second actuator 7 in a lump on the same side with respect to the first frame 31, it is possible to dispose the actuators in a small area, and therefore, it is possible to achieve reduction in size of the light path shifting device 2. Further, since the interconnections for the actuators can be aggregated in the small area, it is possible to easily lay the interconnections. Further, when providing a cooling mechanism for cooling the actuators, there is no need to feed the cooling air to a broad area, and therefore, the cooling efficiency is high. When performing cooling, since the change in magnetic characteristic of the magnet due to the self-heating of the coils and heat generation by the coils is suppressed, it is possible to accurately perform the light path shifting operation.

In the present embodiment, the first vibrating section 7A includes the first magnet 71A fixed to the first protruding part 41, and the first coil 72A disposed so as to be opposed to the first magnet 71A and fixed to the base member 5, and the second vibrating section 7B includes the second magnet 71B fixed to the second protruding part 42, and the second coil 72B disposed so as to be opposed to the second magnet 71B and fixed to the base member 5. Similarly, the first actuator 6 includes the third magnet 61 and the third coil 62, the third coil 62 is fixed to the base member 5, and the third magnet 61 is fixed to the first frame 31. As described above, by using the vibratory actuators in which the magnet and the coil are made to be opposed to each other, and the magnet is moved by energizing the coil, it is possible to provide the small and simple configuration to the first actuator 6 and the second actuator 7. Further, since the coils are disposed on the fixed side instead of the movable side, there is no need to lay the interconnections on the movable side, and it is easy to connect the interconnections to the coils.

In the present embodiment, the moving direction of the first magnet 71A, the moving direction of the second magnet 71B, and the direction in which the third magnet and the third coil move relatively are all directions crossing the surface of the glass plate 30. Therefore, in both of the first actuator 6 and the second actuator 7, the gap between the magnet and the coil does not vary, or the variation in the gap is small when oscillating the glass plate 30. Therefore, it is possible to avoid the situation in which the coil is pulled by and then stuck at the magnet. Further, there is no need to enlarge the gap between the magnet and the coil in order to avoid the interference or the stiction between the magnet and the coil. Therefore, it is possible to reduce the size of the magnet to obtain the necessary drive force, and thus, the component cost can be reduced. Further, by reducing the component size, it is possible to achieve reduction in size and reduction in weight of the first actuator 6 and the second actuator 7.

In the present embodiment, the first actuator 6 is provided with the magnet holding plate 63 and the coil holding plate 64 functioning as the back yoke. Further, in the second actuator 7, the first vibrating section 7A is provided with the magnet holding plate 73A and the coil holding plate 74A functioning as the back yoke, and the second vibrating section 7B is provided with the magnet holding plate 73B and the coil holding plate 74B functioning as the back yoke.

Therefore, since it is possible to increase the magnetic efficiency, the magnet provided to each of the actuators 6, 7 can be made smaller. Thus, it is possible to achieve reduction in size and reduction in weight of the first actuator 6 and the second actuator 7. Further, it is possible to reduce the component cost.

Modified Examples

Although in the embodiment described above, in each of the first actuator 6 and the second actuator 7, the magnet is held on the movable side, and the coil is held on the fixed side, it is also possible to adopt a configuration in which the coil is held on the movable side, and the magnet is held on the fixed side.

Although the embodiment described above has the configuration of using the vibratory actuator having the magnet and the coil opposed to each other to generate the drive force due to the Lorentz force as the first actuator 6 and the second actuator 7, it is also possible to use actuators operating on other principles. It is possible to adopt, for example, a piezo actuator.

What is claimed is:
1. A light path shifting device comprising:
an optical member on which incident light is incident;
a first frame configured to hold the optical member;
a second frame configured to support the first frame in a state of being swingable around a first oscillation axis;
a base member configured to support the second frame in a state of being swingable around a second oscillation axis crossing the first oscillation axis;
a first actuator configured to oscillate the first frame around the first oscillation axis; and
a second actuator configured to oscillate the second frame around the second oscillation axis, wherein
a light path of the incident light is shifted in a first direction and a second direction crossing the first direction by oscillating the first frame and the second frame to thereby change an incident angle of the incident light to the optical member,
the first actuator has a first magnet and a first coil,
the second actuator has a second magnet and a second coil, and
the first magnet, the first coil, the second magnet and the second coil are disposed within a plane including the first oscillation axis and the second oscillation axis.
2. The light path shifting device according to claim 1, wherein
the optical member is a light transmissive substrate, and
the first frame is disposed so as to surround the tight transmissive substrate, and the second frame is disposed so as to surround the first frame.
3. The light path shifting device according to claim 1, wherein
the first frame includes a first shaft part and a second shaft part,
the first frame is coupled to the second frame with the first shaft part and the second shaft part, and
the first oscillation axis is a straight line connecting the first shaft part and the second shaft part to each other.
4. The light path shifting device according to claim 1, wherein
the second frame includes a second frame main body part surrounding the first frame, and a first protruding part and a second protruding part protruding from the second frame main body part, and a protruding direction of the first protruding part and a protruding direction of the second protruding part are a same direction.

5. A light path shifting device comprising:
an optical member on which incident light is incident;
a first frame configured to hold the optical member;
a second frame configured to support the first frame in a state of being swingable around a first oscillation axis;
a base member configured to support the second frame in a state of being swingable around a second oscillation axis crossing the first oscillation axis;
a first actuator configured to oscillate the first frame around the first oscillation axis; and
a second actuator configured to oscillate the second frame around the second oscillation axis, wherein
a light path of the incident light is shifted in a first direction and a second direction crossing the first direction by oscillating the first frame and the second frame to thereby change an incident angle of the incident light to the optical member,
the second frame includes a second frame main body part surrounding the first frame, and a first protruding part and a second protruding part protruding from the second frame main body part,
a protruding direction of the first protruding part and a protruding direction of the second protruding part are a same direction,
the second actuator includes a first vibrating section and a second vibrating section,
the first vibrating section is provided to the first protruding part, and
the second vibrating section is provided to the second protruding part.

6. The light path shifting device according to claim 5, wherein
the first actuator is disposed in an area sandwiched between the first protruding part and the second protruding part.

7. The light path shifting device according to claim 5, wherein
the first vibrating section includes a first magnet fixed to the first protruding part, and a first coil disposed so as to be opposed to the first magnet and fixed to the base member, and
the second vibrating section includes a second magnet fixed to the second protruding part, and a second coil disposed so as to be opposed to the second magnet and fixed to the base member.

8. The light path shifting device according to claim 7, wherein
the first actuator includes a third magnet and a third coil,
the third coil is fixed to the base member, and
the third magnet is fixed to the first frame.

9. The light path shifting device according to claim 8, wherein
a moving direction of the first magnet, a moving direction of the second magnet, and a direction in which the third magnet and the third coil move relatively are all directions crossing a surface of the optical member.

10. An image display device comprising:
the light path shifting device according to claim 1 disposed in a light path of image light, wherein
the first actuator and the second actuator are driven to change the light path of the image light.

11. The image display device according to claim 10, further comprising:
a light source;
a light modulation device configured to modulate light emitted from the light source pixel by pixel; and
a projection optical system configured to project the light modulated by the light modulation device in an enlarged manner, wherein
the light path shifting device is disposed between the light modulation device and the projection optical system.

12. A light path shifting device comprising:
an optical member on which incident light is incident;
a first frame configured to hold the optical member;
a second frame configured to support the first frame in a state of being swingable around a first oscillation axis;
a base member configured to support the second frame in a state of being swingable around a second oscillation axis crossing the first oscillation axis;
a first actuator configured to oscillate the first frame around the first oscillation axis; and
a second actuator configured to oscillate the second frame around the second oscillation axis, wherein
a light path of the incident light is shifted in a first direction and a second direction crossing the first direction by oscillating the first frame and the second frame to thereby change an incident angle of the incident light to the optical member,
the first frame is disposed so as to surround the optical member,
the second frame is disposed so as to surround the first frame, and
the base member is disposed so as to surround the second frame.

13. The light path shifting device according to claim 1, wherein
within the plane including the first oscillation axis and the second oscillation axis, both the first actuator and second actuators are disposed on one side of the optical member.

* * * * *